(12) United States Patent
Olarig et al.

(10) Patent No.: US 11,733,764 B2
(45) Date of Patent: Aug. 22, 2023

(54) DEVICES CAPABLE OF DETECTING AND ALLOCATING POWER AND ASSOCIATED METHOD

(71) Applicant: Samsung Electronics Co., Ltd., Suwon-si (KR)

(72) Inventors: Sompong Paul Olarig, Pleasanton, CA (US); Matthew Bryson, Los Gatos, CA (US); Stephen Fischer, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 48 days.

(21) Appl. No.: 17/023,360

(22) Filed: Sep. 16, 2020

(65) Prior Publication Data

US 2021/0405733 A1 Dec. 30, 2021

Related U.S. Application Data

(60) Provisional application No. 63/046,684, filed on Jun. 30, 2020.

(51) Int. Cl.
| | |
|---|---|
| *G06F 1/26* | (2006.01) |
| *G06F 1/32* | (2019.01) |
| *G06F 1/3287* | (2019.01) |
| *H02J 1/14* | (2006.01) |

(52) U.S. Cl.
CPC .............. *G06F 1/3287* (2013.01); *H02J 1/14* (2013.01)

(58) Field of Classification Search
CPC ................................. G06F 1/3287; H02J 1/14
See application file for complete search history.

(56) References Cited

U.S. PATENT DOCUMENTS

| | | | |
|---|---|---|---|
| 8,751,836 B1 | 6/2014 | Piszczek et al. | |
| 9,075,607 B2 | 7/2015 | Olsson et al. | |
| 9,917,440 B2 | 3/2018 | Luh et al. | |
| 2010/0070789 A1 | 3/2010 | Hori et al. | |
| 2010/0332860 A1* | 12/2010 | Trantham | G06F 1/263 |
| | | | 713/300 |
| 2013/0268789 A1 | 10/2013 | Yang | |

(Continued)

FOREIGN PATENT DOCUMENTS

CN 110209606 A 9/2019

*Primary Examiner* — Nitin C Patel
(74) *Attorney, Agent, or Firm* — Renaissance IP Law Group LLP

(57) ABSTRACT

A device capable of self-detecting and self-allocating additional power and associated method are disclosed. The device includes a first module to route current from first power pins to a voltage rail having the first voltage level. The device includes a second module coupled to second power pins associated with a second voltage level. The second module routes current from the second power pins to the voltage rail having the first voltage level via a connecting voltage rail. The method includes determining, by the device, whether or not a presence of unused power pins is detected. Based on the detection, the method includes calculating a total amount of available additional power, repurposing the unused power pins as actively used power pins, and updating a power budget value based on the total amount of available additional power. The device may dynamically allocate power to accelerators based on a power allocation table and the power budget value.

20 Claims, 7 Drawing Sheets

(56) References Cited

U.S. PATENT DOCUMENTS

2016/0308649 A1* 10/2016 Burger .................. H04L 5/0053
2017/0026188 A1* 1/2017 Herzel ...................... G06F 1/30
2017/0084332 A1* 3/2017 Lim ........................ H02M 3/04
2018/0150092 A1* 5/2018 Morroni ................ H02M 3/158
2020/0073464 A1* 3/2020 Bernat .................. G06F 1/3234

* cited by examiner

POWER ALLOCATION TABLE — 108

| ACCELERATOR INFORMATION 610 | POWER USAGE INFORMATION 615 |
|---|---|
| ACCELERATOR 1 | POWER USAGE 1 |
| ACCELERATOR 2 | POWER USAGE 2 |
| ● | ● |
| ● | ● |
| ● | ● |
| ACCELERATOR N | POWER USAGE N |

DEVICES CAPABLE OF DETECTING AND ALLOCATING POWER AND ASSOCIATED METHOD

RELATED APPLICATION DATA

This application claims the benefit of U.S. Provisional Application Ser. No. 63/046,684, filed on Jun. 30, 2020, which is hereby incorporated by reference.

TECHNICAL AREA

The present disclosure relates to power management associated with a device, and more particularly, to devices capable of detecting and allocating power.

BACKGROUND

Some devices may support a maximum power consumption. However, the devices may not be capable of detecting and/or reporting the actual power consumed by the device. In addition, the devices may not support different power budgets depending on different form factors, e.g., based on how many connectors used, the type of connector used, and/or thickness of connector form factors.

Due to different power configurations, what may be needed is the ability of a system to detect and determine the power required for devices, and dynamically adjust the power appropriately without user intervention. Some power may be provided by adding a maximum number of storage devices up to a maximum power allowed. Computational storage acceleration tasks may run on the device occasionally exceeding the specified maximum power. Performance and/or power throttling firmware may be deployed to reduce and keep power within the maximum power limit, although this may add complexity and defeat the cost and/or performance benefits. There may be no support for the device to automatically detect additional power provided by the system, or for use of otherwise unused power pins.

BRIEF SUMMARY

Various embodiments of the disclosure include a device, comprising a first module coupled to one or more first power pins associated with a first voltage level. The first module may be configured to route current from the one or more first power pins to a voltage rail having the first voltage level. The device may include a second module coupled to one or more second power pins associated with a second voltage level. The second module may be configured to route current from the one or more second power pins to the voltage rail having the first voltage level via a connecting voltage rail.

Some embodiments include method for managing power of a device. The method may include determining, by the device, whether or not a presence of unused power pins is detected. Based on determining that the presence of the unused power pins is detected, the method may include calculating a total amount of available additional power, repurposing the unused power pins as actively used power pins, and updating a power budget value based on the total amount of available additional power.

BRIEF DESCRIPTION OF THE DRAWINGS

The foregoing and additional features and advantages of the present disclosure will become more readily apparent from the following detailed description, made with reference to the accompanying figures, in which:

FIG. 6 illustrates a block diagram of the power allocation table of FIG. 1 in accordance with some embodiments.

DETAILED DESCRIPTION

Figure 1:
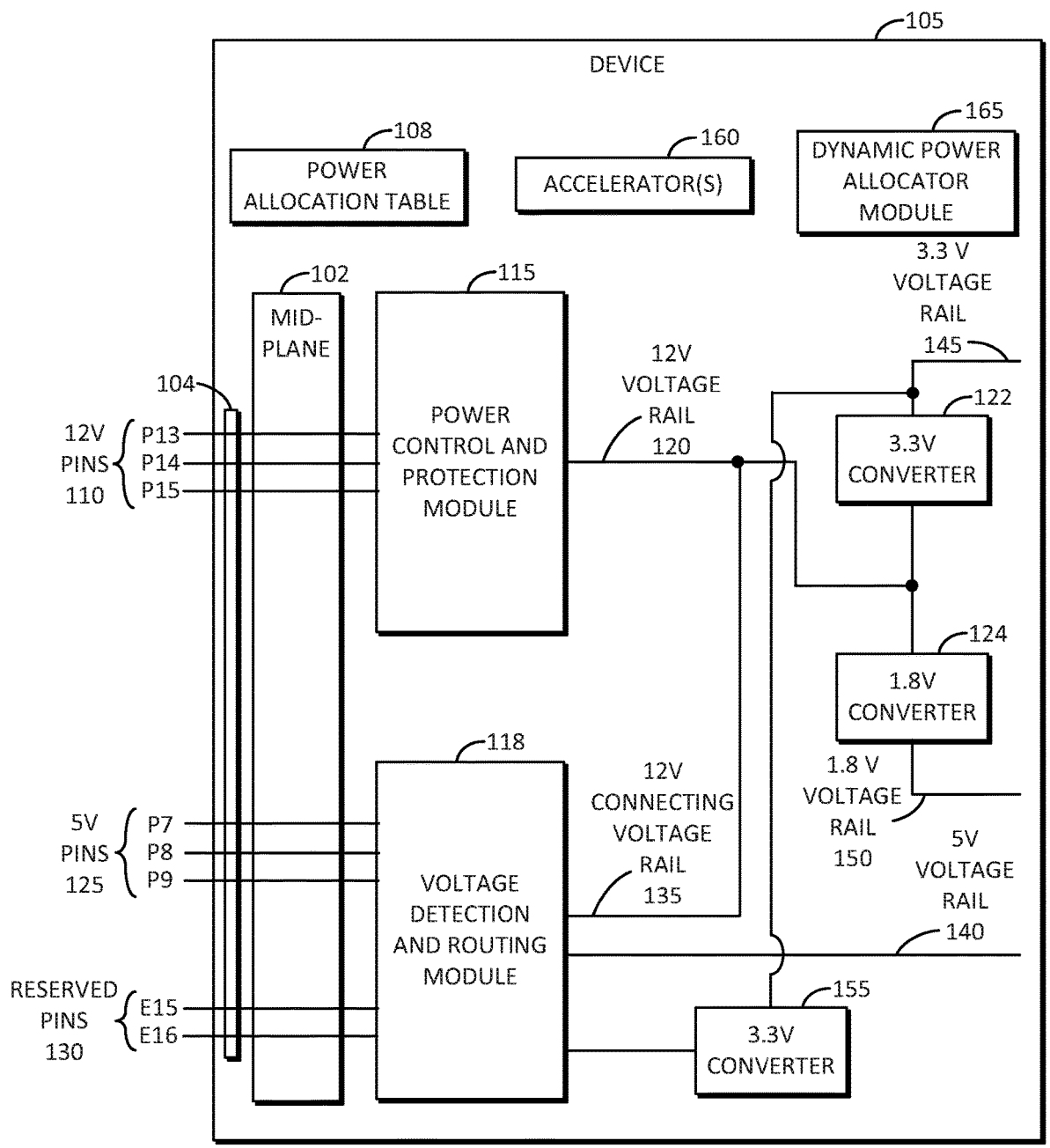
FIG. 1 illustrates a block diagram of a device that is capable of self-detecting and self-allocating additional power in accordance with some embodiments.

Reference will now be made in detail to embodiments disclosed herein, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first device could be termed a second device, and, similarly, a second device could be termed a first device, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Some U.2 based devices may support a maximum power consumption of about 25 Watts (W) per device. However, the devices may not be capable of detecting and/or reporting the actual power consumed by the device. Recently, a new scalable class of connectors has been proposed by the Peripheral Component Interconnect Special Interest Group (PCI SIG) called SFF-TA-100X, where X can be 2, 6, 7, 8, etc. The devices may not support different power budgets depending on the form factors, e.g., how many 1002 (1C, 2C or 4C) connectors used, or the type of connector used and thickness of the form factors, e.g., 1× or 2×. A 2× connector may consume about twice as much power as a 1× connector. The proposed SFF-TA-1008 has been forecasted by some as the next generation connector form factor for solid state drives (SSDs).

Due to different power configurations of SFF-TA-100X based systems, what may be needed is the ability of a system to detect and determine the power required for the SFF-TA-100X based devices installed, and dynamically adjust the power appropriately without user intervention. Some power may be provided by adding a maximum number of storage devices up to a maximum power allowed. Computational storage acceleration tasks may run on the device occasionally exceeding the specified maximum power. Performance and/or power throttling firmware may be deployed to reduce and keep power within the maximum power limit, although this may add complexity and defeat the cost and/or performance benefits. There may be no support for the device to automatically detect additional power provided by the system.

Embodiments disclosed herein include a device, system, and method for enabling any device with a connector such as a U.2 connector, a Peripheral Component Interconnect Express (PCIe) connector, a an SFF-TA-100X connector, or the like, to automatically detect any additional power beyond normal maximum power by detecting electrical current and/or power on existing used power pins and/or additional unused power pins provided by the system, and routing that power to the appropriate voltage rail, without necessarily interacting with a processor, service processor, baseboard management controller (BMC), manager, controller, and/or the like. This may allow any system vendor to have a customized solution by modifying the system vendor's existing chassis, by providing additional power by increasing the current, and/or by using one or more available unused and/or reserved pins of the U.2 connector as 12 Volt (V) power pins. In some embodiments, the power pins may be direct current (DC) power pins.

Some embodiments disclosed herein may include a storage device, such as an SSD, capable of self-detecting and self-allocating additional power. Some embodiments disclosed herein may include a graphics processing unit (GPU). Some embodiments disclosed herein may include a compute express link (CXL) device. The disclosed device, system, and method may use voltage and/or current detection logic to detect additional electrical power and/or an additional current source. The device can maintain its own power allocation table and enable one or more components to run at a higher power level or range. The disclosed device, system, and method may provide additional power through otherwise unused and/or reserved pins such as unused 5V pins of U.2 or reserved (E15/S16) pins. The disclosed device, system, and method may automatically route the additional power to an appropriate voltage rail. The disclosed device, system, and method may be compatible with a current standard U.2 connector, and applicable to other connectors such as SFF-TA-100X and PCIe connectors, or the like.

Embodiments disclosed herein may provide an ability for the disclosed system to provide additional power either by increasing the electrical current of standard 12V pins and/or by using reserved pins to provide additional power pins. The disclosed system may enable third party system vendors to reuse most of their existing infrastructure. As a result, the third party system vendors can bring SSD-based systems, for example, to the market more quickly. The disclosed device, system and method can determine how much power to operate without negotiating with a service processor or BMC, thereby resulting in fewer design changes other than possibly some additional power pins on a mid-plane.

The disclosed device, system, and method may detect additional power available using a standard connector. After power on, the device can detect and determine how much available power is provided by the system. The device may enable additional accelerators to take advantage of additional power. The additional power can be provided by a) increasing current on the existing 12V pins, b) connecting power to otherwise unused pins, or c) connecting power to reserved pins. The device can maintain an internal power consumption record of each accelerator and can select and/or enable which accelerator to use.

FIG. 1 illustrates a block diagram of a device 105 that is capable of self-detecting and self-allocating additional power in accordance with some embodiments. The device 105 may include an SSD, a chassis, an application specific integrated circuit (ASIC), a field programmable gate array (FPGA), or the like. The device 105 may be used with an existing chassis without major changes to the hardware and/or software infrastructure, with the possible exception of an improved mid-plane 102. The mid-plane 102 may include power pins (e.g., 110, 125, and 130). The device 105 may include a power distribution board 104, which may be improved to increase the current available to the device 105.

The device 105 may include a power control and protection module 115. The power control and protection module 115 may be connected to 12V pins 110 such as P13, P14, and P15. It will be understood that the power control and protection module 115 may be connected to other pins. The power control and protection module 115 may route one or more of the power pins 110 to a 12V voltage rail 120. The device 105 may include a voltage detection and routing module 118. The voltage detection and routing module 118 may be connected to otherwise unused 5V pins 125 such as P7, P8, and P9. The voltage detection and routing module 118 may be connected to reserved pins 130 such as E15 and E16. It will be understood that the voltage detection and routing module 118 may be connected to other pins.

Based on the voltage detection and routing module 118 detecting a 12V voltage source associated with one or more of the otherwise unused 5V pins 125, the voltage detection and routing module 118 may route one or more of the otherwise unused power pins 125 to the 12V voltage rail 120 via a 12V connecting voltage rail 135. Based on the voltage detection and routing module 118 detecting a 5V voltage source associated with one or more of the otherwise unused 5V pins 125, the voltage detection and routing module 118 may route one or more of the otherwise unused power pins 125 to a 5V voltage rail 140. Based on the voltage detection and routing module 118 detecting a 12V voltage source associated with one or more of the reserved pins 130, the voltage detection and routing module 118 may route one or more of the reserved pins 130 to the 12V voltage rail 120 via the 12V connecting voltage rail 135. Based on the voltage detection and routing module 118 detecting a 5V voltage source associated with one or more of the reserved pins 130, the voltage detection and routing module 118 may route one or more of the reserved pins 130 to the 5V voltage rail 140.

The device 105 may include a 3.3V converter 122 and/or a 1.8V converter 124. The 3.3V converter 122 may transform a 12V voltage associated with the 12V voltage rail 120 to a 3.3V voltage associated with a 3.3V voltage rail 145. The 1.8V converter 124 may transform the 12V voltage associated with the 12V voltage rail 120 to a 1.8V voltage associated with a 1.8V voltage rail 150. The device 105 may include a second 3.3V converter 155. The 3.3V converter 155 may receive and transform a voltage associated with otherwise unused pins (e.g., 125 and/or 130) to a 3.3V voltage associated with the 3.3V voltage rail 145. It will be understood that the device 105 may include any suitable voltage converter and associated voltage rails.

The device may include one or more accelerators 160. The one or more accelerators 160 may be performance accelerators that boost the performance of the device 105. The one or more accelerators 160 may include one or more components, such as an embedded central processing unit (CPU), a TensorCore, an ASIC, an FPGA, firmware, software, or the like, or any combination thereof. The one or more accelerators 160 may include any suitable means of accelerating the processing and/or data storage to which the CPU, TensorCore, ASIC, FPGA, or the like, are attached or otherwise associated with.

The device 105 may include a power allocation table 108 to store power usage of each of the accelerators 160. The power allocation table 108 may be stored in a volatile memory such as a dynamic random access memory (DRAM) of the device 105. Alternatively or in addition, the power allocation table 108 may be persistently stored in a non-volatile memory such as an SSD. The device 105 may include a dynamic power allocator module 165, which may dynamically allocate power to the one or more accelerators 160 based on power usage information stored in the power allocation table 108. For example, the dynamic power allocator module 165 may process requests to enable the one or more accelerators 160, as further described below.

Figure 2:
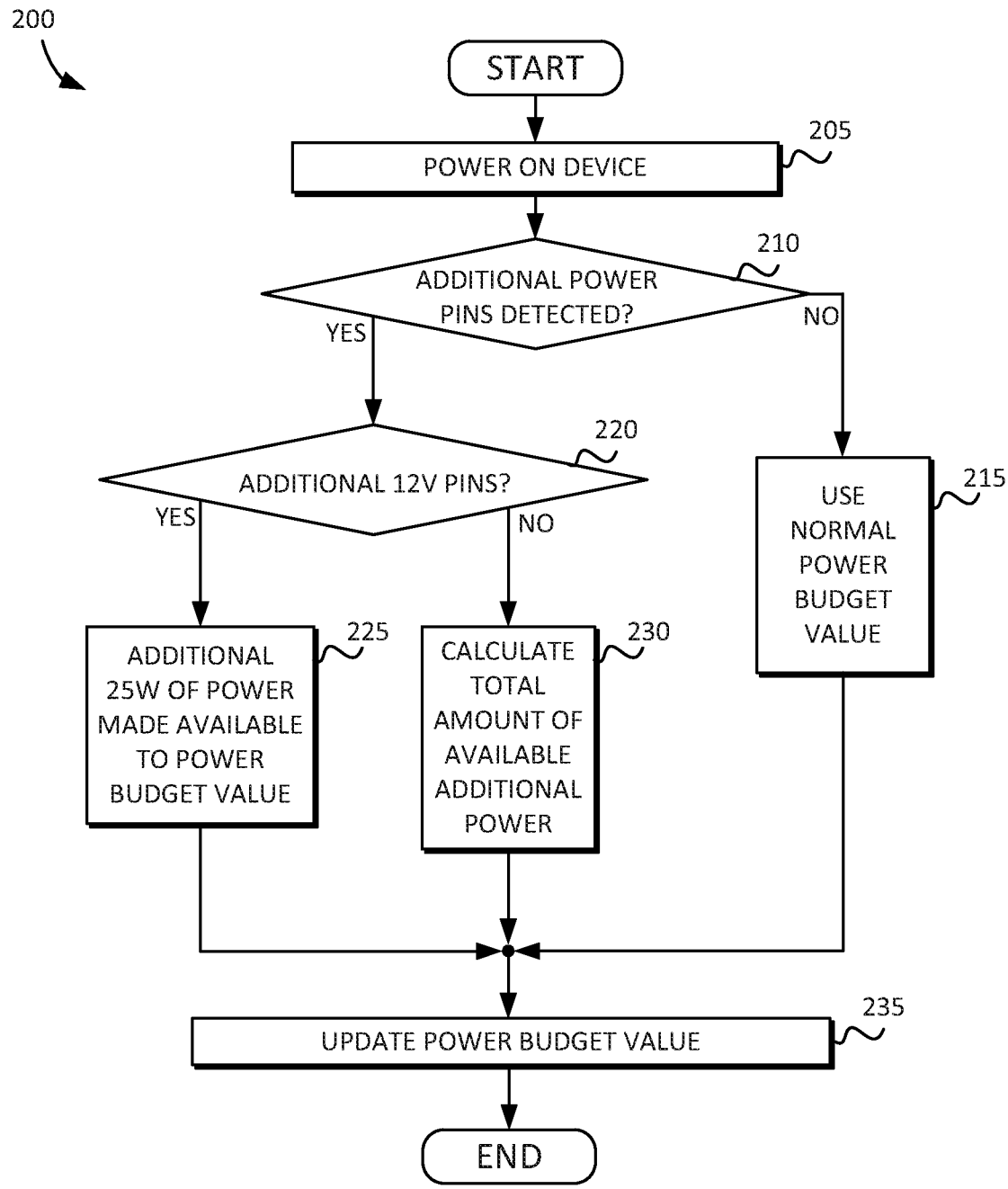
FIG. 2 is a flow diagram illustrating a technique for self-detecting and self-allocating additional power in accordance with some embodiments.

FIG. 2 is a flow diagram 200 illustrating a technique for self-detecting and self-allocating additional power in accordance with some embodiments. Reference is now made to FIGS. 1 and 2.

At 205, the device 105 may be powered on. In some embodiments, a power-on self-test (POST) may be performed. At 210, the device 105 may determine whether additional power pins are detected. Based on determining that additional power pins are not detected, a normal power budget value may be used at 215. Otherwise, based on determining that additional power pins are detected, the device 105 may determine whether additional 12V pins are available at 220. Based on determining that additional 12V pins are available at 220, an additional 25 W of power may be made available to the power budget value. Otherwise, based on determining that an additional voltage rail that is lower than 12V is available at 220, the device 105 may calculate a total amount of available additional DC power at 230.

For example, the device 105 may use an equation corresponding to "power equals voltage times current" (i.e., P=VI) to determine the total amount of available additional power at 230. For each additional power pin detected, the equation P=VI may be used so that a total amount of available additional power for each may be determined. For example, the device 105 may detect a voltage and current associated with a particular pin, and calculate the power associated with the particular pin based on the detected voltage and current. In other words, the total amount of available additional power value may be determined by aggregating a calculated power value for each additional power pin. At 235, the power budget value available to the device 105 may be updated. In other words, the total amount of available additional power may be added to the power budget value available to the device 105.

By measuring an exact electrical current value of the 12V pins and detecting power on additional pins, the device 105 can tabulate how much power is available for the device 105 to consume without necessarily negotiating with a service processor. The device 105 may be capable of providing power up to 50 W or more using otherwise unused and/or reserved pins. In some embodiments, the maximum power budget value may be determined by firmware on the device 105. Alternatively or in addition, a host and/or a BMC may provide the power budget value using one or more interfaces such as general-purpose input/output (GPIO), a non-volatile memory express management interface (NVMe-MI), a system management bus (SMBus), or the like.

Figure 3:
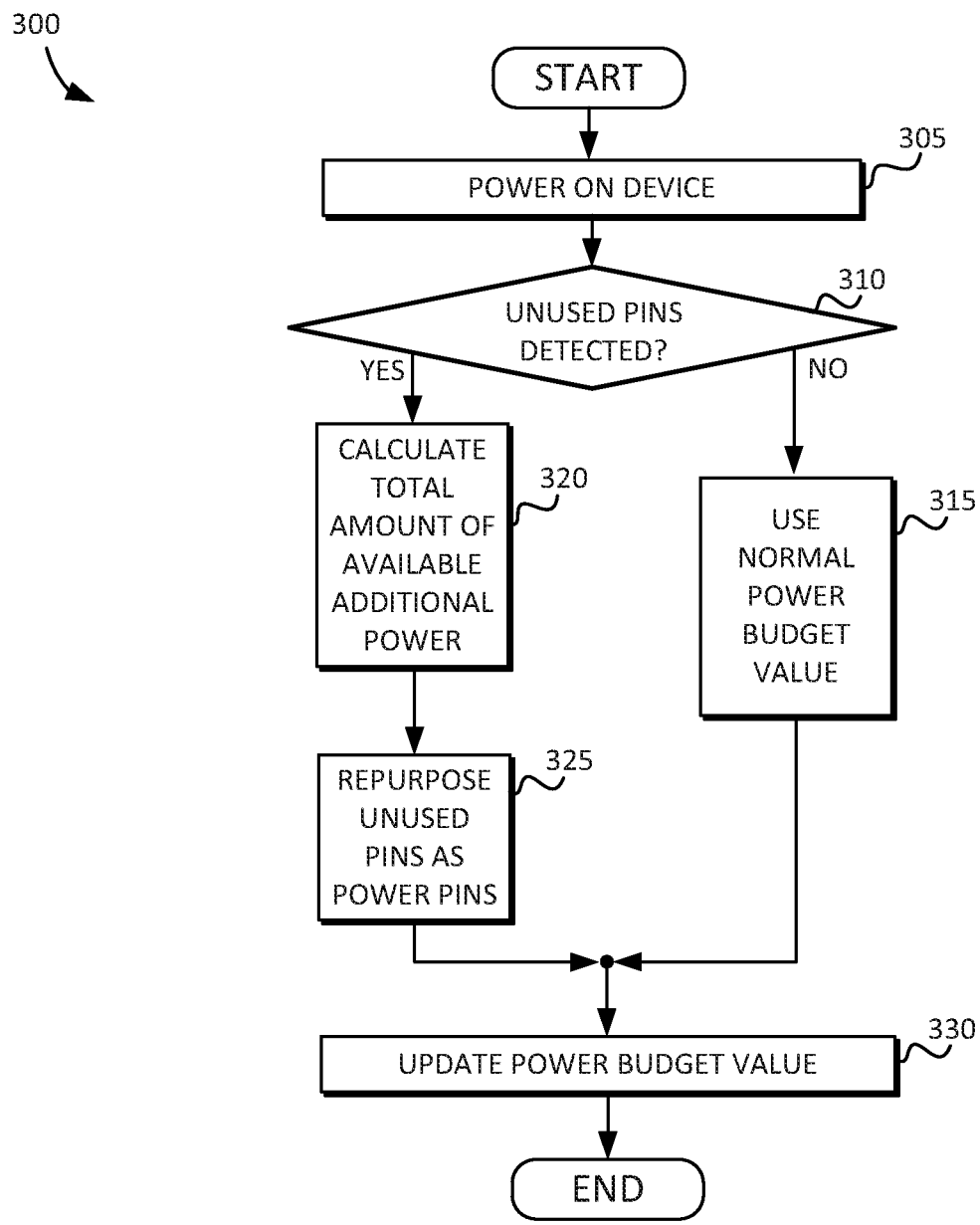
FIG. 3 is a flow diagram illustrating a technique for self-detecting and self-allocating additional power from otherwise unused pins in accordance with some embodiments.

FIG. 3 is a flow diagram 300 illustrating a technique for self-detecting and self-allocating additional power from otherwise unused pins in accordance with some embodiments. Reference is now made to FIGS. 1 and 3.

At 305, the device 105 may be powered on. At 310, the device 105 may detect one or more unused pins. Based on detecting that there are no unused pins at 310, the device 105 may use a normal power budget value at 315. Otherwise, based on detecting that there are unused pins at 310, the device 105 may calculate a total amount of available additional power that is available to the device 105 at 320, as explained above with reference to FIG. 2. At 325, the device 105 may repurpose the unused pins as power pins as actively used power pins. This may include routing the additional power made available from the previously unused pins to an appropriate voltage rail (e.g., 12V voltage rail 120, 5V voltage rail 140, etc.) of the device 105. At 330, the power budget value available to the device 105 may be updated. In other words, the total available additional power value determined at 320 may be added, at 330, to the power budget value available to the device 105.

During the power on process of the device 105, a maximum available power supply (i.e., the power budget value) may be determined, followed by the testing of each individual accelerator from among the accelerators 160. This may enumerate processing devices and tests related to power utilization, and store this information in a chart or power allocation table 108, as further explained below. This information may be used by the device 105 to determine the device's ability to implement or include additional acceleration devices during periods where the processing and tests may not fit within the available power budget of the device 105.

Figure 4:
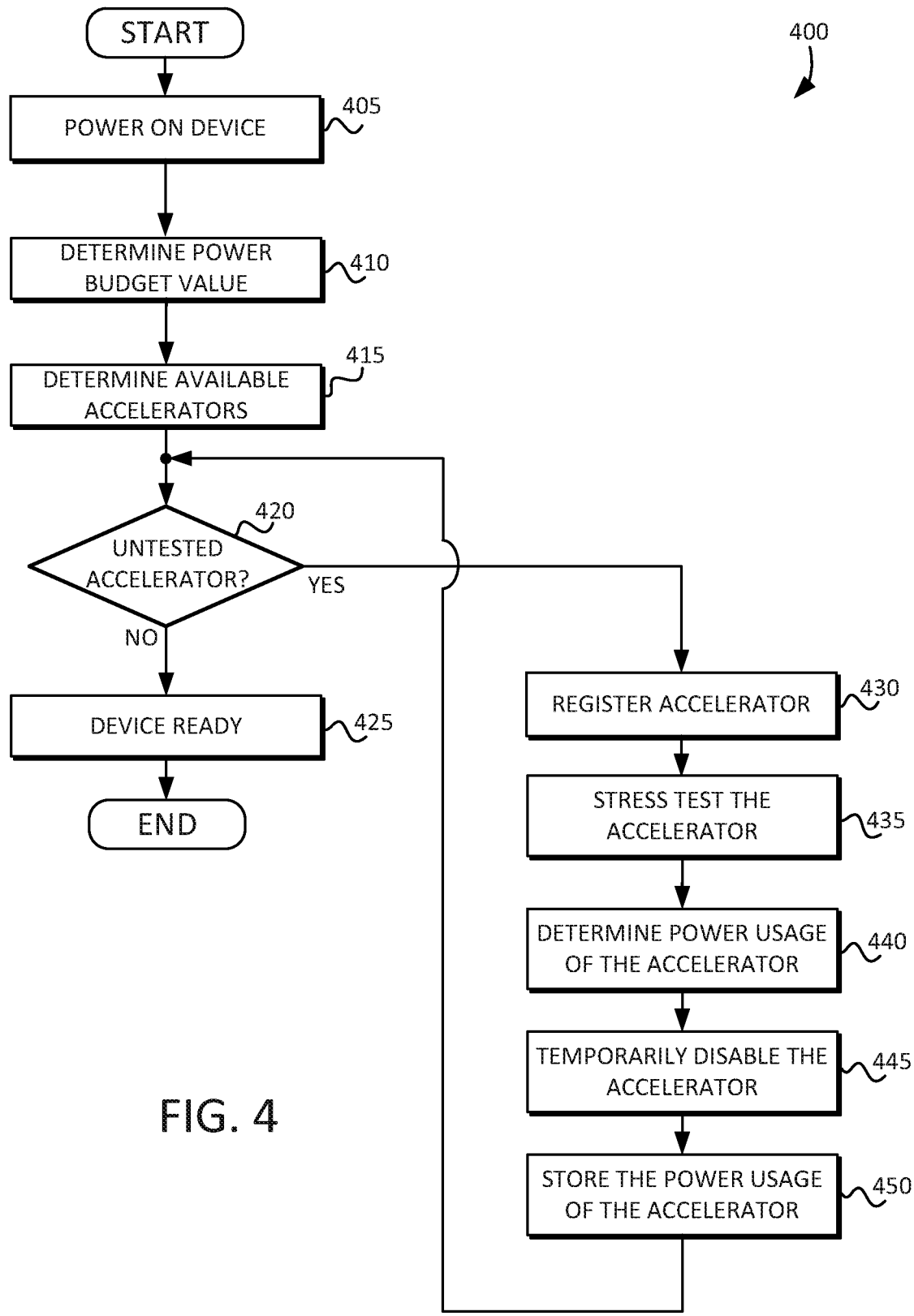
FIG. 4 is a flow diagram illustrating a technique for determining and storing power usage of one or more accelerators in accordance with some embodiments.

FIG. 4 is a flow diagram 400 illustrating a technique for determining and storing power usage of one or more accelerators in accordance with some embodiments. Reference is now made to FIGS. 1 and 4.

At 405, the device 105 may be powered on. At 410, the device 105 may determine a power budget value available to the device 105, as explained above with reference to FIGS. 2 and 3. In some embodiments, the dynamic power allocator module 165 may determine the power budget value. In some embodiments, the device 105 may receive the power budget value from a host. At 415, the device 105 may determine whether the device 105 includes available accelerators 160. For example, the dynamic power allocator module 165 may determine whether the device 105 includes available accelerators 160. At 420, the device 105 may determine whether there are any untested accelerators. For example, the dynamic power allocator module 165 may determine whether there are any untested and/or unqualified accelerators. Based on determining that there are no untested accelerators, the device 105 can be in a ready state as shown at 425.

Otherwise, based on determining that there are untested accelerators, the device 105 may register a particular accelerator at 430. For example, the dynamic power allocator module 165 may register the particular accelerator. At 435, the device 105 may stress test the particular accelerator. For example, the dynamic power allocator module 165 may stress test the particular accelerator. At 440, the device 105 may determine power usage of the particular accelerator. For example, the dynamic power allocator module 165 may determine the power usage of the particular accelerator. At 445, the device 105 may temporarily disable the particular accelerator. For example, the dynamic power allocator module 165 may temporarily disable the particular accelerator. At 450, the device 105 may store the power usage of the particular accelerator. For example, the dynamic power allocator module 165 of the device 105 may store the power usage of the particular accelerator in the power allocation table 108, as further described below. The flow may return to 420, and another determination may be made whether there are untested accelerators. Steps 430 through 450 may be repeated until there are no further untested accelerators. The flow may then proceed to 425, in which the device 105 is set as ready. Accordingly, a request for a particular accelerator may trigger the calculation of power usage by the other accelerators, and may determine the procedure of enabling the requested accelerator.

Figure 5:
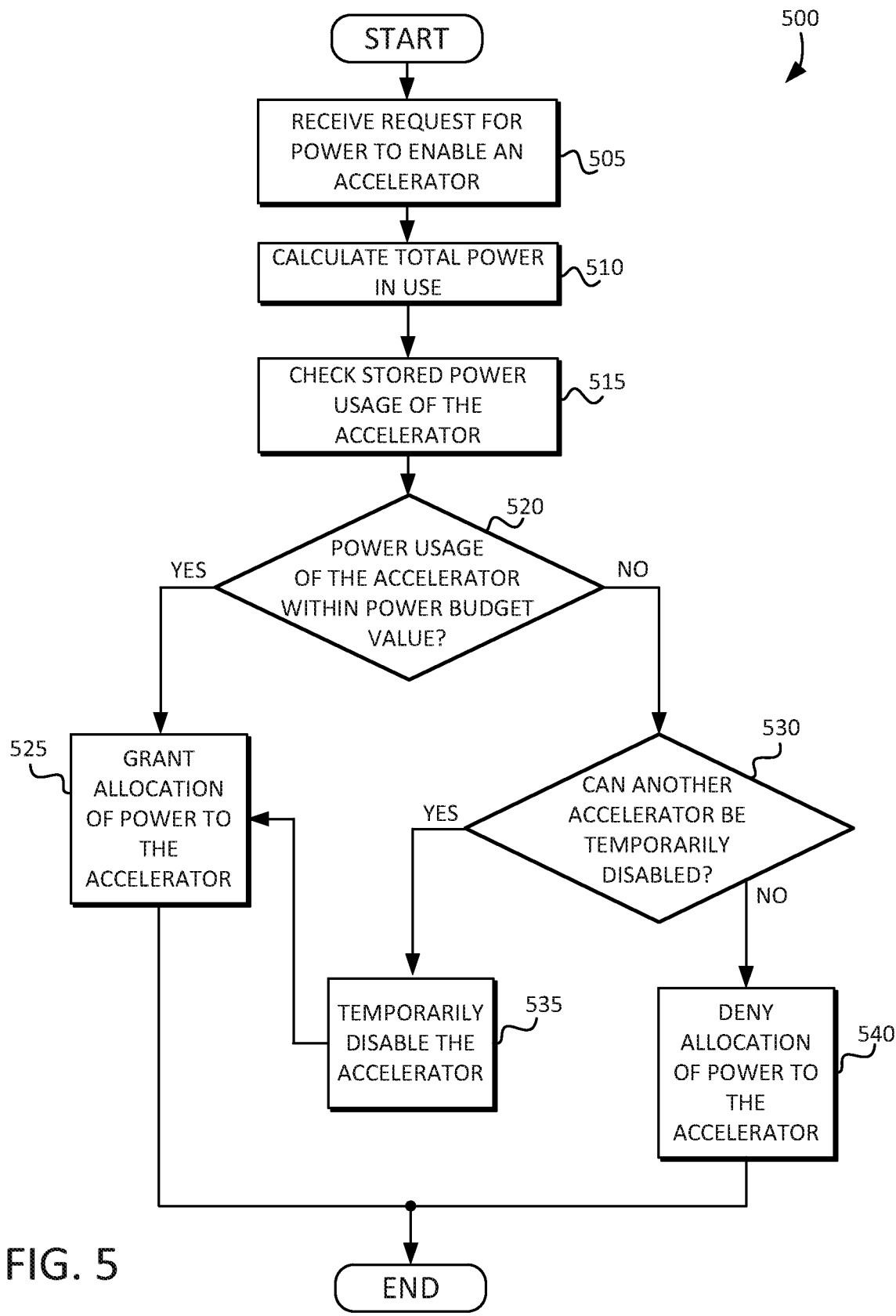
FIG. 5 is a flow diagram illustrating a technique for managing power usage of the one or more accelerators in accordance with some embodiments.

FIG. 5 is a flow diagram 500 illustrating a technique for managing power usage of the one or more accelerators 160 in accordance with some embodiments. Reference is now made to FIGS. 1 and 5.

At 505, the device 105 may generate and/or receive a request for power to enable a particular accelerator from among the accelerators 160. For example, the dynamic power allocator module 165 of the device 105 may receive the request. At 510, the device 105 may calculate a total power currently in use by the device 105. For example, a current and/or power metering unit may determine the total power currently in use by the device 105. In some embodiments, the device 105 may query a host through one or more interface protocols such as NVMe-MI over SMBus, or the like, to determine additional available power. In some embodiments, the dynamic power allocator module 165 of the device 105 may calculate or otherwise determine the total power currently in use by the device 105. At 515, the device 105 may check and/or read a stored power usage of the particular accelerator. For example, the device 105 may check the stored power usage of the particular accelerator in the power allocation table 108, as further described below. For example, the dynamic power allocator module 165 of the device 105 may check the stored power usage of the particular accelerator in the power allocation table 108. At 520, the device 105 may determine whether the stored power usage of the particular accelerator is within the power budget value of the device 105. In other words, the device 105 can determine whether, after enabling the particular accelerator, the power usage of the particular accelerator added to the total power currently in use of the device 105 would be less than or equal to the power budget value of the device 105. In some embodiments, the dynamic power allocator module 165 of the device 105 may make this determination.

Based on determining that the stored power usage of the particular accelerator is within the power budget value of the device 105, the device 105 may grant an allocation of power to the particular accelerator at 525. For example, the dynamic power allocator module 165 of the device 105 may grant the allocation of power to the particular accelerator. Otherwise, based on determining that the stored power usage of the particular accelerator is not within the power budget value of the device 105, the device 105 may make another determination at 530 whether another accelerator from among the accelerators 160 can be temporarily disabled. In some embodiments, dynamic power allocator module 165 of the device 105 may make this determination. Based on determining at 530 that another accelerator can be temporarily disabled, then the device 105 may temporarily disable that accelerator at 535. In some embodiments, dynamic power allocator module 165 of the device 105 may make this determination. The flow may then proceed to 525, in which power may be granted to the particular accelerator. Otherwise, based on determining at 530 that another accelerator cannot be temporarily disabled, then the device 105 may deny an allocation of power to the particular accelerator at 540. In some embodiments, dynamic power allocator module 165 of the device 105 may make this determination.

The dynamic power allocator module 165 of the device 105 may enable various accelerators dynamically (e.g., enable or disable) based on available power. When more power becomes available, the dynamic power allocator module 165 of the device 105 may enable more or all of the accelerators 160, thereby resulting in a lower cost and/or better performance. Accordingly, additional power may be dynamically allocated without necessarily changing the connector, motherboard, or chassis. In some cases, this may change the thermal budget of the device 105, and a BMC may increase the speed of fans associated with the device 105 due to extra heat that may be dissipated by the device 105.

FIG. 6 illustrates a block diagram of the power allocation table 108 of FIG. 1 in accordance with some embodiments. Reference is now made to FIGS. 1 and 6. The power allocation table 108 may include accelerator information 610 and power usage information 615. The accelerator information 610 may include information about one or more accelerators 160 (e.g., accelerator 1, 2, through N). The accelerator information 610 may include an accelerator type for each of the accelerators. The power usage information 615 may include power usage information about the one or more accelerators 160 (e.g., accelerator 1, 2, through N). For example, the power usage information may include an amount of power in W used by each of the accelerators.

The power allocation table 108 may be stored in a volatile memory such as a dynamic random access memory (DRAM) of the device 105. Alternatively or in addition, the power allocation table 108 may be persistently stored in a non-volatile memory such as an SSD. When the power allocation table 108 is persistently stored, in some embodiments, the device 105 need not run the stress tests on the accelerators 160 on each power up because the power usage information may be already stored in the power allocation table 108. The device 105 may store the power usage of the each of the accelerators 160 in the power allocation table 108. The device 105 may check the stored power usage of the particular accelerator in the power allocation table 108. The device 105 may use the power allocation table 108 to determine whether to allocate an amount of power to a particular accelerator (e.g., accelerator 2) from among the accelerators 160. The device 105 may determine whether the stored power usage of the particular accelerator is within the power budget value of the device 105, as explained above with reference to FIG. 5.

The power allocation table 108 may include power usage information for each accelerator within the device 105, such as those included in Table 1 below:

| Accelerator Type | Power Usage |
| --- | --- |
| FPGA-Compression Kernel | 1000 mW |
| FPGA-Checksum Kernel | 100 mW |
| ARM Core | 1500 mW |
| ARM Core | 2500 mW |
| ARM CoProcessor | 200 mW |
| Tensor Processing Unit | 2000 mW |
| Custom ASIC | 750 mW |

When an accelerator has the ability to reduce power consumption by adjusting frequency, the reduced power may be captured by the power allocation table 108. In the event of a power loss or power reduction, the device 105 may go through a device reset and may reduce back to its standard or reduced power allocation, at least temporarily. In this case, only essential units such as a main CPU, standard memory, key functions of an FPGA, or the like, may be enabled.

Figure 7:
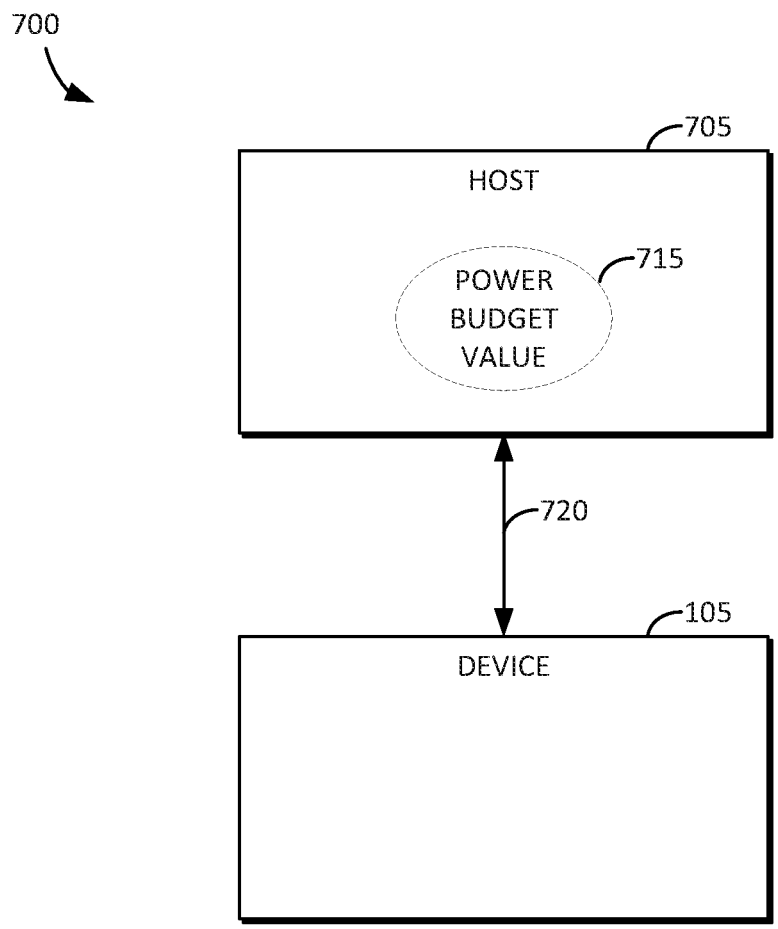
FIG. 7 illustrates a system including a host and the device of FIG. 1 in accordance with some embodiments.

FIG. 7 illustrates a system 700 including a host 705 and the device 105 of FIG. 1 in accordance with some embodiments. As shown in FIG. 7, the host 705 may be connected to the device 105. In some embodiments, the host 705 may include the device 105. The host 705 may provide the power budget value 715 to the device 105 using one or more interfaces 720 with the device 105.

The various operations of methods described above may be performed by any suitable means capable of performing the operations, such as various hardware and/or software component(s), circuits, and/or module(s).

Some embodiments may include a device 105. The device 105 may include a first module 115 coupled to one or more first power pins 110 associated with a first voltage level. In some embodiments, the first module 115 is configured to route current from the one or more first power pins 110 to a voltage rail 420 having the first voltage level. The device 105 may include a second module 118 coupled to one or more second power pins 125 associated with a second voltage level. In some embodiments, the second module 118 is configured to route current from the one or more second power pins 125 to the voltage rail 120 having the first voltage level via a connecting voltage rail 135. The device 105 may include one or more third power pins 130 coupled to the second module 118. In some embodiments, the second module 118 is configured to route current from the one or more third power pins 130 to the voltage rail 120 having the first voltage level via the connecting voltage rail 135.

In some embodiments, the one or more first power pins 110 include one or more 12 Volt (V) power pins, the one or more second power pins 125 include one or more 5V power pins, the one or more third power pins 130 include one or more reserved pins, and the voltage rail 120 is a 12V voltage rail. In some embodiments, the second module 118 is configured to receive a 12V signal via the one or more otherwise unused 5V power pins 125, and to route current from the one or more otherwise unused 5V power pins 125 to the 12V voltage rail 120 via the connecting voltage rail 135. In some embodiments, the second module 118 is configured to receive a 5V signal via the one or more otherwise unused 5V power pins 125, and to route current from the one or more otherwise unused 5V power pins 125 to the 5V voltage rail 140. In some embodiments, the second module 118 is configured to receive a 12V signal via the one or more reserved power pins 130, and to route current from the one or more reserved power pins 130 to the 12V voltage rail via the connecting voltage rail 135.

The device 105 may include one or more accelerators 160 and a power allocation table that 108 is configured to store power usage information about the one or more accelerators 160. The device 105 may include a dynamic power allocator module 165 that is configured to dynamically allocate power to the one or more accelerators 160 based on the power usage information stored in the power allocation table 108.

In some embodiments, the dynamic power allocator module 165 is configured to calculate the power usage information for the one or more accelerators 160 based on a stress test of the one or more accelerators 160. In some embodiments, the dynamic power allocator module 165 is configured to at least one of i) temporarily enable or ii) temporarily disable the one or more accelerators 160 based on the power usage information stored in the power allocation table 108.

Some embodiments include a method for determining, by the device 105, whether or not a presence of unused power pins is detected. Based on determining that the presence of the unused power pins is detected, the method may include calculating a total amount of available additional power based on the presence of the unused power pins, repurposing the unused power pins as actively used power pins, and updating a power budget value based on the total amount of available additional power. The method may include using a normal power budget value based on determining that the presence of the unused power pins is not detected.

The method may include determining an existence of one or more untested accelerators. Based on determining the existence of the one or more untested accelerators, the method may include i) registering a particular accelerator from among the one or more untested accelerators, ii) stress testing the particular accelerator, iii) determining a power usage of the particular accelerator being stress tested, iv) temporarily disabling the particular accelerator, and v) storing a power usage value corresponding to the power usage of the particular accelerator in a power allocation table 108. The method may include repeating i) through v) for each of the one or more untested accelerators.

The method may include receiving a request for power to enable a first accelerator. The method may include calculating a total power currently in use by the device 105. The method may include reading a power usage value of the first accelerator from a power allocation table 108. The method may include determining whether the total power currently in use by the device 105 plus the power usage value associated with the first accelerator is less than or equal to the power budget value. Based on determining that the total power currently in use by the device 105 plus the power usage value of the first accelerator is less than or equal to the power budget value of the device 105, the method may include granting an allocation of power to the first accelerator. Based on determining that the total power currently in use by the device 105 plus the power usage value of the first accelerator is not less than or equal to the power budget value of the device 105, the method may include determining whether a second accelerator can be temporarily disabled. Based on determining that the second accelerator can be temporarily disabled, the method may include temporarily disabling the second accelerator, and granting an allocation of power to the first accelerator. Based on determining that the second accelerator cannot be temporarily disabled, the method may include not disabling the second accelerator, and denying an allocation of power to the first accelerator.

The blocks or steps of a method or algorithm and functions described in connection with the embodiments disclosed herein may be embodied directly in hardware, in a software module executed by a processor, or in a combination of the two. Modules may include hardware, software, firmware, or any combination thereof. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, ASICs, embedded computers, cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this present disclosure as defined in the claims.

What is claimed is:

1. A device, comprising:
   a first module coupled to one or more first power pins associated with a first voltage level, wherein the first module is to route current from the one or more first power pins to a first voltage rail having the first voltage level; and
   a second module coupled to one or more second power pins, wherein the second module is to route current from the one or more second power pins to a second voltage rail having a second voltage level;
   wherein the device is to perform a determination that the first voltage level is present at one or more of the one or more second power pins; and
   wherein the second module is to route current from the one or more of the one or more second power pins to the first voltage rail based on the determination.

2. The device of claim 1, further comprising one or more third power pins coupled to the second module, wherein the second module is to route current from the one or more third power pins to the voltage rail having the first voltage level via a connecting voltage rail.

3. The device of claim 2, wherein:
   the one or more first power pins include one or more DC power pins;
   the one or more second power pins include one or more free power pins;
   the one or more third power pins include one or more reserved pins; and
   the voltage rail is a DC voltage rail.

4. The device of claim 3, wherein the second module is to receive a 12V signal via the one or more free power pins, and to route current from the one or more free power pins to the 12V voltage rail via the connecting voltage rail.

5. The device of claim 3, further comprising a lower than 12V voltage rail, wherein the second module is to receive additional power via the one or more free power pins, and to route current from the one or more free power pins to the lower than 12V voltage rail.

6. The device of claim 3, wherein the second module is to receive a 12V signal via at least one of the one or more reserved power pins, and to route current from the at least one of the one or more reserved power pins to the 12V voltage rail via the connecting voltage rail.

7. The device of claim 1, further comprising a power allocator module that is to allocate power to the one or more accelerators based on the power usage information.

8. The device of claim 7, wherein the power allocator module is to calculate the power usage information for the one or more accelerators based on a stress test of the one or more accelerators.

9. The device of claim 7, wherein the power allocator module is to enable the one or more accelerators based on the power usage information stored in the power allocation table.

10. A device, comprising:
a first module coupled to one or more first power pins associated with a first voltage level, wherein the first module is to route current from the one or more first power pins to a voltage rail having the first voltage level; and
a second module coupled to one or more second power pins associated with a second voltage level, wherein the second module is to route current from the one or more second power pins to the voltage rail having the first voltage level via a connecting voltage rail; and
one or more accelerators to receive power from the voltage rail, and a power allocation table that is to store power usage information about the one or more accelerators.

11. A method for managing power, the method comprising:
determining, by a device, a presence of one or more free power pins;
based on the determining:
calculating an amount of available additional power;
assigning at least one of the one or more free power pins as one or more actively used power pins; and
updating a power budget based on the amount of available additional power.

12. The method of claim 11, further comprising using a normal power budget based on the determining.

13. The method of claim 11, further comprising determining a test status of an accelerator.

14. The method of claim 13, further comprising:
based on the determining test status of the accelerator:
registering the accelerator;
stress testing the accelerator;
determining a power usage of the accelerator; and
storing a power usage value corresponding to the power usage of the accelerator in a power allocation table.

15. The method of claim 14, wherein the accelerator is a first accelerator, the test status is a first test status, the power usage is a first power usage, and the power usage value is a first power usage value, the method further comprising:
determining a second test status of a second accelerator; and
based on the determining the second test status of the second accelerator:
registering the second accelerator;
stress testing the second accelerator;
determining a second power usage of the second accelerator; and
storing a second power usage value corresponding to the second power usage of the second accelerator in the power allocation table.

16. The method of claim 13, further comprising:
receiving a request for power to enable the accelerator;
calculating an power use by the device;
reading a power usage value of the accelerator from a power allocation table; and
determining the power use by the device plus the power usage value associated with the accelerator is within the power budget.

17. The method of claim 16, further comprising:
based on the determining the power use by the device plus the power usage value associated with the accelerator is within the power budget, granting an allocation of power to the accelerator.

18. The method of claim 13, wherein the accelerator is a first accelerator, the method further comprising:
receiving a request for power to enable the first accelerator;
calculating a power use by the device;
reading a power usage value of the first accelerator from a power allocation table; and
determining the power use by the device plus the power usage value associated with the accelerator exceeds the power budget; and
based on the determining the power use by the device plus the power usage value associated with the first-accelerator exceeds the power budget, determining a status of a second accelerator.

19. The method of claim 18, further comprising:
based on the determining the status of the second accelerator:
modifying an operating state of the second accelerator; and
granting an allocation of power to the first accelerator.

20. The method of claim 18, further comprising:
based on the determining the status of the second accelerator:
maintaining an operating state of the second accelerator.

* * * * *